United States Patent
Werthmann et al.

(10) Patent No.: US 8,757,555 B2
(45) Date of Patent: Jun. 24, 2014

(54) CONCEPT OF A VARIABLE WINGLET FOR LATERAL LOAD REDUCTION FOR COMBINED LATERAL AND VERTICAL LOAD REDUCTION, AND FOR IMPROVING THE PERFORMANCE OF MEANS OF LOCOMOTION

(75) Inventors: Vitalij Werthmann, Hamburg (DE); Michael Kordt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1367 days.

(21) Appl. No.: 11/914,411

(22) PCT Filed: May 19, 2006

(86) PCT No.: PCT/EP2006/004774
§ 371 (c)(1),
(2), (4) Date: Nov. 14, 2007

(87) PCT Pub. No.: WO2006/122826
PCT Pub. Date: Nov. 23, 2006

(65) Prior Publication Data
US 2008/0191099 A1 Aug. 14, 2008

Related U.S. Application Data

(60) Provisional application No. 60/682,736, filed on May 19, 2005.

(30) Foreign Application Priority Data

May 19, 2005 (DE) .......................... 10 2005 023 117
Jun. 21, 2005 (DE) .......................... 10 2005 028 688

(51) Int. Cl.
*B64C 23/06* (2006.01)

(52) U.S. Cl.
USPC ...................................................... 244/199.4

(58) Field of Classification Search
USPC ...................... 244/199.4, 91, 200, 200.1, 201
See application file for complete search history.

(56) References Cited

U.S. PATENT DOCUMENTS

| | | | | |
|---|---|---|---|---|
| 2,565,990 A | * | 8/1951 | Richard | 244/90 R |
| 2,846,165 A | * | 8/1958 | Axelson | 244/90 R |
| 4,017,041 A | | 4/1977 | Nelson | |

(Continued)

FOREIGN PATENT DOCUMENTS

| | | |
|---|---|---|
| DE | 3621800 A1 | 6/1986 |
| DE | 10313290 A1 | 10/2004 |

(Continued)

OTHER PUBLICATIONS

Japanese Office Action for JP application No. 2008-511653, dated May 8, 2012, 2 pages.

*Primary Examiner* — Tien Dinh
(74) *Attorney, Agent, or Firm* — Christopher Paradies; Paradies Law P.A.

(57) ABSTRACT

A device for adapting aerodynamic characteristics of a wing element, includes a winglet, movably attachable to a wing element. The winglet or parts of the winglet may be rotatable in relation to the wing element such that an associated rotary axis with a main direction of extension of the wing element encompasses an angle that differs from an angle of 90°. In addition, a method is disclosed.

22 Claims, 6 Drawing Sheets

(56) References Cited

U.S. PATENT DOCUMENTS

| | | | |
|---|---|---|---|
| 4,455,004 A | | 6/1984 | Whitaker, Sr. |
| 4,457,479 A | | 7/1984 | Daude |
| 4,714,215 A | * | 12/1987 | Jupp et al. ............ 244/199.4 |
| 4,722,499 A | | 2/1988 | Klug |
| 5,988,563 A | | 11/1999 | Allen |
| 6,227,487 B1 | * | 5/2001 | Clark ..................... 244/99.12 |
| 6,547,181 B1 | * | 4/2003 | Hoisington et al. ........ 244/46 |
| 6,827,314 B2 | * | 12/2004 | Barriety ..................... 244/201 |
| 7,780,120 B1 | * | 8/2010 | Fairchild ..................... 244/218 |
| 2004/0000619 A1 | | 1/2004 | Barriety |

FOREIGN PATENT DOCUMENTS

| | | |
|---|---|---|
| DE | 10317258 A1 | 11/2004 |
| EP | 1531126 A1 | 5/2005 |
| GB | 2282996 A | 4/1995 |
| JP | 8-104296 A | 4/1996 |
| RU | 2026240 C1 | 1/1995 |
| WO | WO-03/000547 A1 | 1/2003 |

* cited by examiner

CONCEPT OF A VARIABLE WINGLET FOR LATERAL LOAD REDUCTION FOR COMBINED LATERAL AND VERTICAL LOAD REDUCTION, AND FOR IMPROVING THE PERFORMANCE OF MEANS OF LOCOMOTION

REFERENCE TO RELATED APPLICATIONS

This application claims the benefit of the filing date of U.S. Provisional application No. 60/682,736 filed 19 May 2005, of German patent application 10 2005 023 117.9 filed 19 May 2005, and of German patent application 10 2005 028 688.7 filed 21 Jun. 2005, the disclosure of which is hereby incorporated herein by reference.

FIELD OF THE INVENTION

The field relates to a device and a method for adapting aerodynamic characteristics of an aerodynamically effective construction element or a wing element, to a means of locomotion and to the use of a device for adapting aerodynamic characteristics of a wing element in an aircraft or in a means of locomotion.

BACKGROUND

In modern commercial aircraft, more and more frequently winglets are used, whose purpose it is to reduce the induced resistance of the wing and to increase the Ca/Cw ratio and thus to reduce the resistance and the fuel consumption.

Generally speaking, winglets are rigid constructions at the end of the wings, comprising an aerodynamic profile that is positioned at three specified angles to the direction of airflow. The alignment of the winglets is designed for the longest flight phase, namely for cruising. Moreover, the maximum effect of the winglets is achieved during cruising. This means that winglets are designed for high Mach numbers Ma=0.8 and approx. 10,000 m cruising altitude with corresponding air pressure, density and temperature. The flight phases of climbing flight, approach to landing, takeoff and landing are not taken into account in the above.

U.S. Pat. No. 5,988,563 and US 2004/0000619 A1 each disclose a foldable winglet that may rotate in relation to the wing on an attachment axis and that during flight may be moved between a folded-in and a folded-out position.

Since the aerodynamic load on the winglets is above all extremely high at a large angle of yaw and during lateral gusts, the winglets must be designed so as to be enormously robust for these load cases. Due to the load introduction from the winglet to the wing element, the wing element must then also be designed so as to be correspondingly robust.

WO 03/00547 discloses that loads resulting from vertical maneuvers may be reduced by local control surfaces on the winglet, in that by opening these control surfaces the aerodynamic load is reduced.

SUMMARY OF THE INVENTION

It may be desirable to have a winglet that may be adapted to the operating states of an aircraft.

According to an embodiment, an adaption device for adapting aerodynamic characteristics of a wing element is created, wherein the adaption device comprises a winglet, wherein the winglet is movably attachable to the wing element, and wherein the winglet is rotatable in relation to the wing element such that an angle between an associated rotary axis and a main direction of extension of the wing element differs from 90°.

According to another embodiment, a method for adapting aerodynamic characteristics of a wing element is provided, wherein a winglet attached to the wing element is rotated in relation to the wing element such that an angle between an associated rotary axis and a main direction of extension of the wing element differs from 90°.

According to yet another embodiment, a means of locomotion with a device with the above-described characteristics is provided.

According to yet another embodiment, a device with the above-described characteristics is used in an aircraft.

The spatial position and the movements or rotations of the winglet according to an embodiment may be defined by three angles of the aircraft's body coordinate system. The $\alpha_F$-angle denotes the position of the winglet relative to the $x_F$-axis of the aircraft, which axis generally speaking extends along the longitudinal axis of the fuselage; the $\beta_F$-angle denotes the position of the winglet relative to the $y_F$-axis of the aircraft, which axis generally speaking extends in the direction of the wing tip and perpendicular to the $x_F$-axis; while the $y_F$-angle denotes the position of the winglet relative to the $z_F$-axis, which generally speaking extends in a vertical plane perpendicular to the $x_F$-axis and the $y_F$-axis. For reasons of mathematical unambiguity, a rotary sequence has to be determined, e.g. $\alpha_F$, $\beta_F$, $\gamma_F$.

$y_F$ thus extends from the left wing tip to the right wing tip and may therefore be designated the main axis of extension of the wing element.

The spatial position or the rotations of the winglet may also be described by a body coordinate system or by the Euler rotary angles (compare Brockhaus: Flugregelung, Springer-Verlag, Berlin, 1995).

In this arrangement with the angle $\Phi$, rotation is first on the body's x-axis, as a result of which the y- and z-axes are moved to new spatial axes positions $y_1$ and $z_1$. For the purpose of consistent designation, the axis x is renamed $x_1$. Subsequently, rotation at the angle $\theta$ on the new $y_1$-axis moves the axes $x_1$ and $z_1$ to new positions $x_2$ and $z_2$. The $y_1$-axis is renamed $y_2$. Finally, rotation by the angle $\psi$ takes place on the new $z_2$-axis. z, $z_1$, $z_2$ may concretely also be designated the upward axis, while $\psi$ may be designated the toe angle.

The definition of the body coordinate system is based on a rigid winglet that is attached to the wing element along an axis that extends on the end of the wing element that is located away from the fuselage or that extends within the wing element. This attachment axis may be selected as the body's x-axis. It describes the fold-in or fold-out movement of the winglet relative to the wing element or to the main axis of extension of the wing element. The z-axis then leads through the geometric center of gravity of the winglet and extends so as to be perpendicular to the x-axis. The y-axis then extends perpendicular to the x-axis and z-axis so that a right-hand system is created. In the case of a plane rectangular wing with a plane rectangular winglet that is attached at a right angle, the x-axis and the z-axis are in the winglet plane while the y-axis is perpendicular to the winglet plane. In this special case the two coordinate systems x, y, z and $x_F$, $y_F$, $z_F$ are identical.

With the device according to one example, as a result of the flexible construction, above all as a result of the rotatability of the winglets additionally on the upward axis, the load cases to be dimensioned for the winglets and outer wings may be significantly reduced, in particular in the case of large angles of yaw, in the case of lateral gusts and maneuvers (for example, drastic yaw movements and rolling motion), and thus, the winglet may be designed in an aerodynamically advantageous way. Depending on the angle of yaw, the winglets may rotatably align themselves in relation to the fuselage axis, for example in the direction of the airflow or in the direction of flight, in a way that is similar to sails that are aligned to the direction of the wind. In this way, the winglets may be designed so as to be significantly larger and at the same time, due to the reduced loads, both the winglet and the wing element may be designed so as to be lighter. The advantageous aerodynamic design in conjunction with the reduction in weight results in a particularly significant reduction in the fuel consumption and overall in great economy of the aircraft.

Furthermore, the flexible setting options of the winglet may make possible direct control of wing torsion. In addition to the option of influencing the bending of the wing by fold-in and fold-out winglets, there is now an option available, which option in many cases much more important, of directly influencing wing torsion. In this way in every flight phase, resistance may be minimised and as a result of this still further fuel consumption may be achieved, which represents one of the significant optimisation potentials in aircraft engineering.

As a result of the great flexibility and free movement option of the winglet, furthermore, optimal lift distribution may be achieved in each flight state. By folding-out or folding-in the winglet, by ideally setting the toe angle, and/or by rotating the winglet on the $y_1$-axis, in the approach to landing the coefficient of lift may be increased, and by folding the winglets in during cruising low aerodynamic resistance may be set. For cruising, the winglet may be set relative to the coordinate system of the aircraft, for example for $\alpha_F=5°$, for $\beta_F=15°$ and for $\gamma_F=4°$.

According to another embodiment, the winglet is rotatably attachable to an attachment axis with the wing element. In addition to controlling wing torsion, this provides the option of additionally controlling bending of the wing and of adapting it to various aerodynamic load cases.

The winglet according to one example may be rotatable in relation to the wing element on one, two or three rotary axes. This high degree of flexibility allows high-quality adaptation of the aerodynamic characteristics of the wing element or of the aircraft to the many various operating states such as the takeoff state, landing state, cruising state.

According to yet another embodiment, the winglet may be rotatably attachable on the $y_1$-axis of the body coordinate system of the winglet. In particular in the case of two-sided winglets, which comprise identical or different surfaces above and below the wing, over 180°-rotation the bending moment that is introduced in the wing may be significantly reduced.

A winglet may thus be movably attachable to a wing element in a rotary manner such that the winglet may move by two or three degrees of freedom. Not only may it fold inward in the direction of the fuselage, but it may also assume an angle to the main direction of extension of the wing element, which angle substantially differs from 90°, and/or it may rotate on the $y_1$-axis of the body coordinate system of the winglet. In this way, the winglet may better adapt to various operating states of an aircraft. By means of such adjustment of the winglets to reflect various load cases it is possible to create ideal aerodynamic conditions and at the same time to significantly reduce the aerodynamic loads on the winglets.

Furthermore, the various rotary options of the winglet are used to influence the wake turbulence characteristics of the aircraft.

In a further embodiment, the device further comprises a wing element. The winglet according to one example may, for example, be used on the end of the wing of an aircraft, on a wind power engine, on a windmill and on any desired component of a means of locomotion, which component is exposed to airflow. Other applications are of course also possible.

According to a further embodiment, the device comprises an aerodynamic fairing element between the wing element and the winglet in order to cover any gap between the wing element and the winglet, which gap may be aerodynamically unfavourable. In this way, aerodynamic losses may be avoided.

According to a further embodiment, the device comprises at least one suspension element by means of which the winglet is attached to the wing element.

According to a further embodiment, at least one suspension element is controllably provided so that the winglet may rotate within various degrees of freedom. In order to provide the suspension element so that it is controllably movable, according to another embodiment, at least one suspension element is moved by a driven spindle, for example with the use of an electric motor.

According to another embodiment, the device further comprises a drive device for moving the winglet and/or the suspension element. In this arrangement, the drive device may comprise electric, hydraulic and/or piezoelectric drives. Furthermore, active materials, in particular piezoceramics, may be used.

According to another embodiment of the device, the winglet is divided into an upper and a lower part, with the upper and/or the lower part of the winglet being movable. In this arrangement, the upper or the lower part may be designed so as to slightly, or significantly, project outward. The same applies to the inclination in the direction of the fuselage axis. For example, in a winglet that extends above and below the wing element, only the top surface or only the bottom surface may be movable.

According to another embodiment, the is in three parts, with an upper, a lower and an outer part, wherein at least one part is movable. According to a further embodiment, each of these parts in turn may be divided into several sub-parts, and each sub-part itself may be, movable. According to a further embodiment furthermore, in addition to the winglet, also a part of the wing element or an entire wing element including the winglet may be rotatable.

According to another embodiment of the method, rotation of the winglet is controlled by an onboard computer unit. In this arrangement, the onboard computer unit may control the winglet on the basis of measured aircraft data such as for example flight altitude, direction of airflow, angle of incidence, air pressure, temperature, etc.

According to another embodiment of the method, the onboard computer unit may regulate the movement of a winglet using a regulating unit. The onboard computer unit or the regulating unit alone, for example reacts to any change in various parameters and automatically sets the winglets accordingly. Regulation may be uniform or adaptive in relation to individual aircraft data. In addition, a particular operating state (such as for example takeoff state, landing state, cruising state) may be used as a criterion for adjusting the position of the winglet.

According to a further embodiment of the method, the winglet controls any wing torsion and/or wing bending is controlled so that the wing profile may be aerodynamically optimised.

According to yet another embodiment, a wind power engine or a windmill with a device featuring the above-described characteristics is created.

The embodiments relating to the device also apply to the method and to the means of locomotion as well as to the use, and vice versa.

With the device and the method according to one example, an effective setting option of the winglets that reflect any operating states of an aircraft may thus be achievable, as a result of which the aerodynamic resistance and the weight-determining loads on the winglets and the wing elements may be reduced. Consequently the winglets, the wings and the transition from the wing to the fuselage may be designed so as to save more weight and so that the fuel consumption may be greatly reduced. In this way, the aircraft's economy may be significantly improved.

BRIEF DESCRIPTION OF THE FIGURES

Below, for further explanation and for an improved understanding of the present invention, embodiments are described with reference to the enclosed drawings. The following are shown.

DETAILED DESCRIPTION

The examples described and drawings rendered are illustrative and are not to be read as limiting the scope of the invention as it is defined by the appended claims.

Identical or similar components in different figures have the same reference characters.

The illustrations in the figures are diagrammatic and not to scale.

Figure 1:
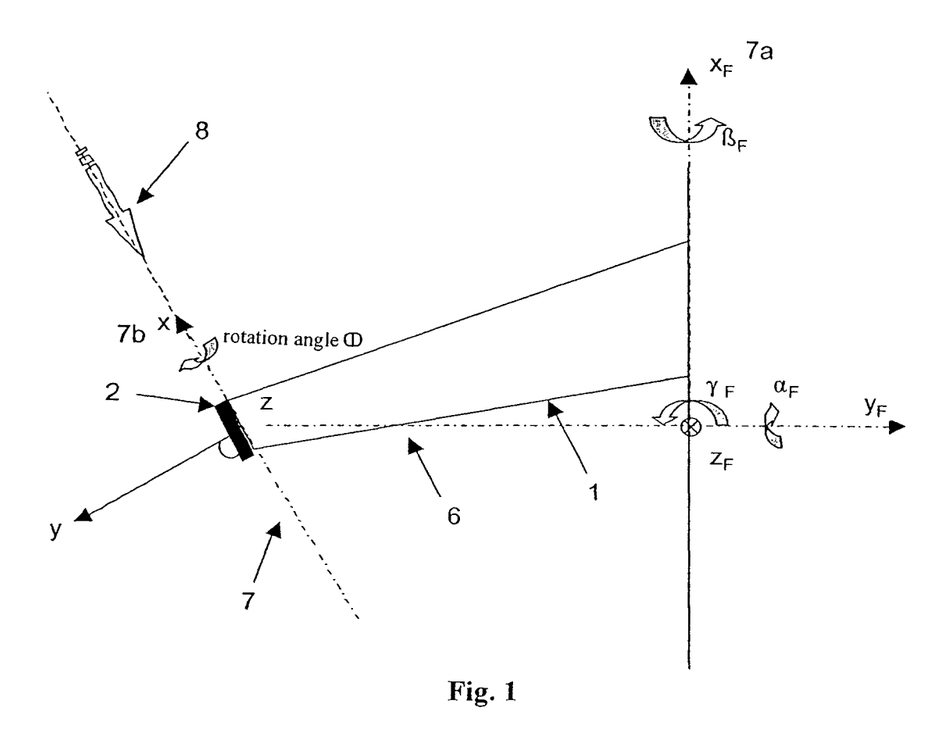
FIG. 1 shows a diagrammatic view of a wing element with a movably attached winglet according to one embodiment.

FIG. 1 shows a diagrammatic top view of a winglet 2 and of a wing element 1 as well as the aircraft's body coordinate system 7a and the winglet's body coordinate system 7b. Furthermore, the main axis of extension 6 of the wing element 1 and a rotary axis 7 of the winglet with the rotary angle $\Phi$ is shown. This is the first rotary axis 7 according to the convention of the Euler angles. By rotation on the x-axis, the winglet 2 may be folded out or folded in. The arrow 8 indicates the direction of the local airflow during flight with a local angle of yaw at the winglet. For example, if the winglet is not to be rotated by the Euler angles $\Phi$ and $\theta$, then the axes x, $x_1$ and $x_2$ are identical; likewise y, $y_1$ and $y_2$ and z, $z_1$ and $z_2$. Rotation on the z-axis in the direction of the local airflow then directly results in a reduction in the aerodynamic load and thus in a reduction in the overall load on the winglet.

Figure 2:
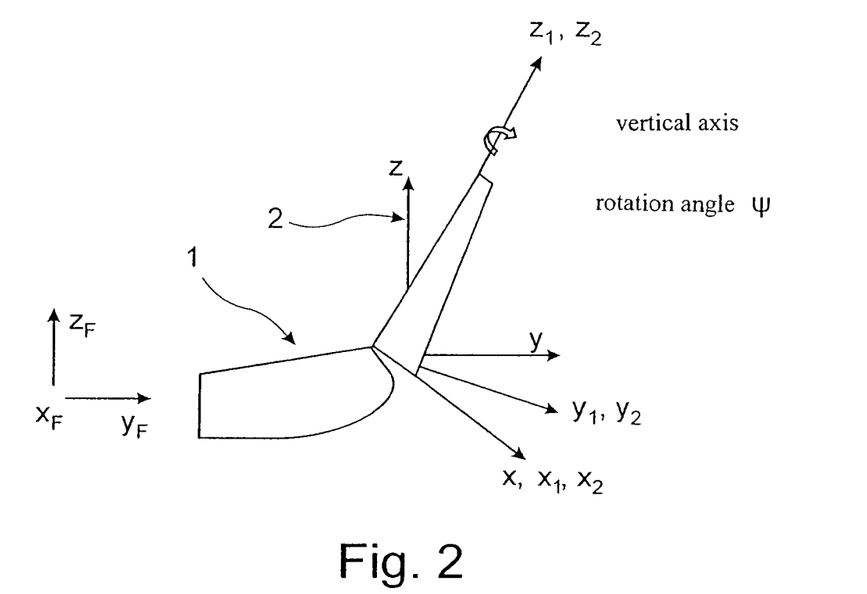
FIG. 2 illustrates a further diagrammatic view of a wing element with a movably attached winglet and its rotary axes according to an embodiment.

FIG. 2 shows a device for adapting a winglet to an operating state of an aircraft, according to one embodiment. Furthermore, a body coordinate system of the winglet is introduced in order to define the rotary axes. By rotation on the x-axis at a rotary angle $\Phi$, the winglet has been brought from the perpendicular position to the new flap position. In this way, the body coordinate system moves to the new axes $x_1$, $y_1$, $z_1$.

Rotation on the $z_2$-axis or on the $y_1$-axis makes it possible to freely select settings required by various flight states or various aerodynamic load cases.

For the sake of clarity, the drawing does not show rotation on the $y_1$-axis so that $x_1=x_2$, $y_1=y_2$, $z_1=z_2$. Only rotation on the $z_2$-axis on the toe angle $\psi$ is illustrated. Illustration of the rotation on the $y_1$- and the $z_2$-axis is also obvious on the basis of FIGS. 1 and 2.

Figure 4:
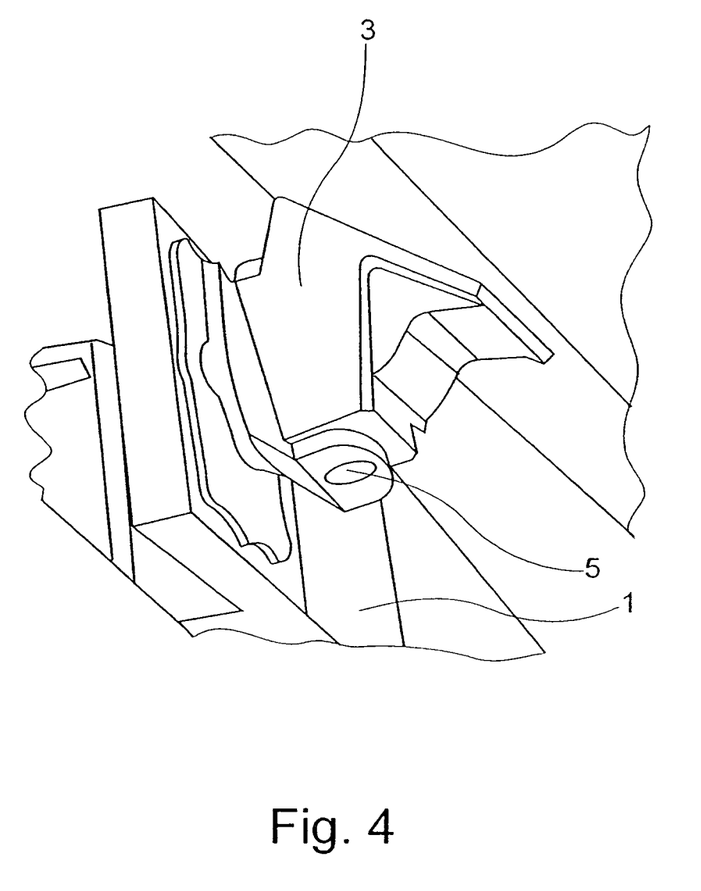
FIG. 4 shows a diagrammatic view of a suspension element according to one embodiment.

The device comprises a wing element 1, a winglet 2 and at least one suspension element 3 (see FIG. 4). The winglet 2 is attached to the wing element 1 by way of a suspension element 3. The device according to FIG. 1 shows the way the winglet may rotate on three (spatial) axes. In this way the winglet 2 may be adapted to the local angle of yaw of the flight state. Adaptation of the toe angle (rotation on the $z_2$-axis of the body coordinate system) and rotation on the $y_1$-axis makes it possible to change (in particular to reduce) the effective surface of the winglet 2 (in the angle-of-yaw flight, during drastic roll and yaw and also during combined roll and yaw), which effective surface is impinged upon by the lateral component of the airflow so that in particular the resulting transverse forces and bending moments on the winglet 2 and thus also on the outer wing 1 are reduced. By changing the toe angle, the rotation on the $y_1$-axis, and by folding-in or folding-out the winglet on the x-axis, the surface of the winglet 2, which surface is aerodynamically effective in the direction of flight, changes.

Figure 3:
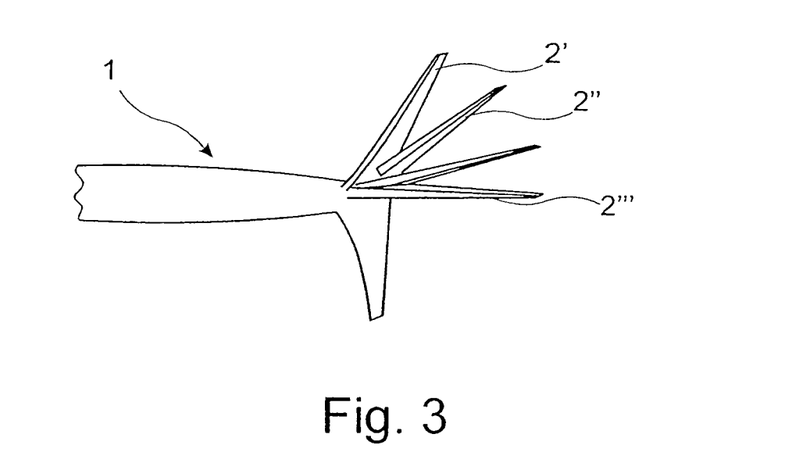
FIG. 3 depicts a further diagrammatic view of a wing element with a movably attached winglet in various positions according to one embodiment.

FIG. 3 shows the movement of the winglet on the x-axis or on the attachment axis. It becomes possible, together with the settability of the toe angle, to optimally set the lift characteristics to any given flight phase. During cruising, i.e. at high altitude and at high speed, the winglet 2' may be folded-in in order to reduce the resistance in this way. Depending on aerodynamic conditions and flight phases, i.e. during side slipping, during climbing, descent or in strong side winds, the winglet 2" may assume corresponding intermediate positions. At low speed, in particular during the approach to landing, where a large coefficient of lift may be desired, the winglet 2''' may be folded out so as to increase the wing surface.

FIG. 4 shows one option of attaching the winglet 2 to a wing element 1. The suspension element 3 shown, of which there is at least one, connects the wing element 1 to the winglet 2. By way of a rotary axis 5, for example, the toe angle may be set in a targeted way to the respective load cases. At the same time the suspension element 3 may be attached so as to be articulated so that the winglet 2 may additionally rotate on an attachment axis (x-axis of the body coordinate system of the winglet) and on the $y_1$-axis. Rotation on the attachment axis makes it possible for the winglet to fold in and out in relation to the aircraft fuselage, as is shown in the front view of the wing-winglet combination in FIG. 2.

Figure 5:
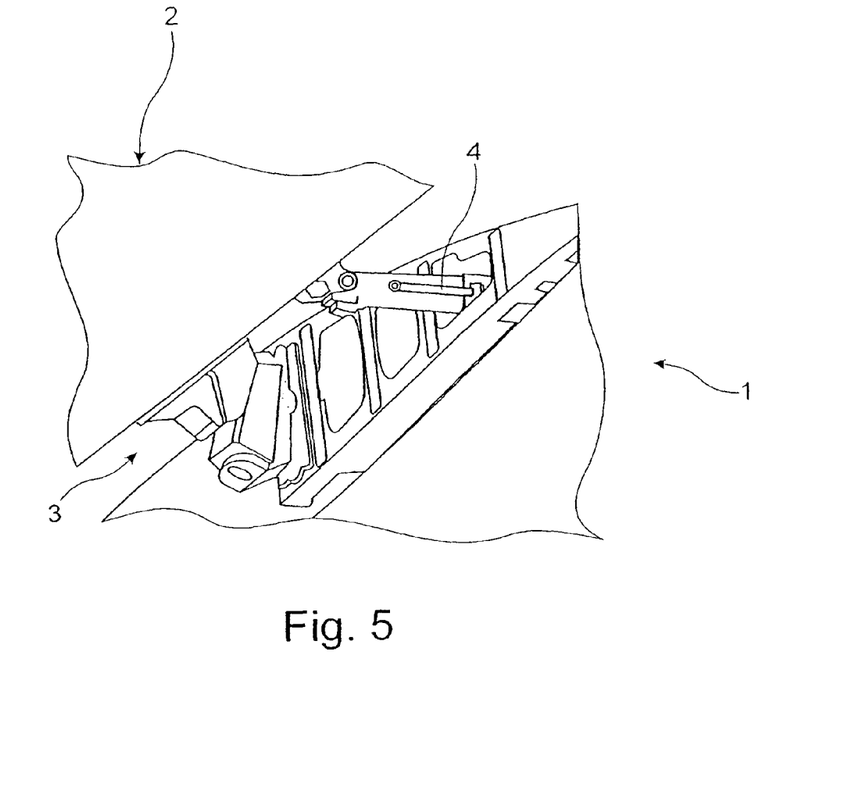
FIG. 5 depicts a diagrammatic view of a controllable suspension element according to one embodiment.

FIG. 5 shows one option of controlling the winglet 2. In this arrangement, rotating the winglet 2 on the upward axis 5, on the y-axis and on the x-axis, may be achieved by a drive motor that retracts and extends a spindle 4 in a targeted manner.

Thus, for example, the winglet 2 rotates on its upward axis 5. Rotation of the winglet 2 on its attachment axis and on the $y_1$-axis may be made possible by a driven articulated suspension element 3.

Figure 6:
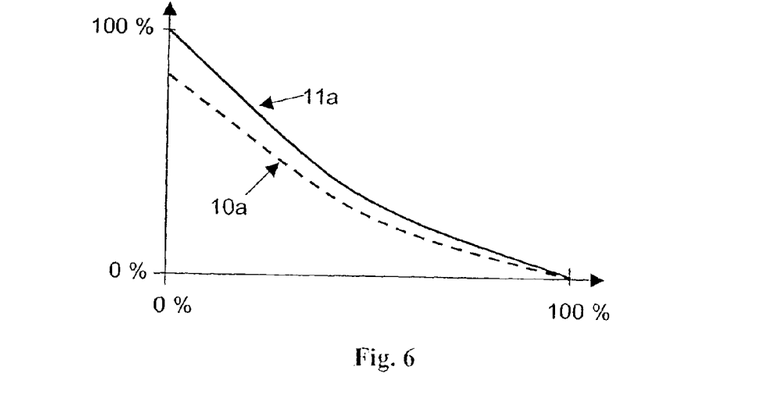
FIG. 6 shows a diagram showing the achieved reduction in the gradient of the bending moments along the winglet with a change in the toe angle of 4 degrees.

FIG. 6 shows the gradient 10a, 11a of the bending moments in the main direction of extension of a rectangular winglet with a change 10a and without a change 11a in the toe angle of 4°. The abscissa shows the position $z_p$ on the winglet in relation to the winglet length $l_w$ from the transition of the winglet to the wing right up to the winglet tip in %, while the ordinate shows the amount of the bending moment in % in relation to the respective position $z_p/l_w$. For an angle of yaw maneuver according to the European airworthiness requirement JAR25, a change in the toe angle of 4° results in a significant reduction in the gradient of the bending moments. This results in a correspondingly significant reduction in the structural weight of the winglet.

Figure 7:
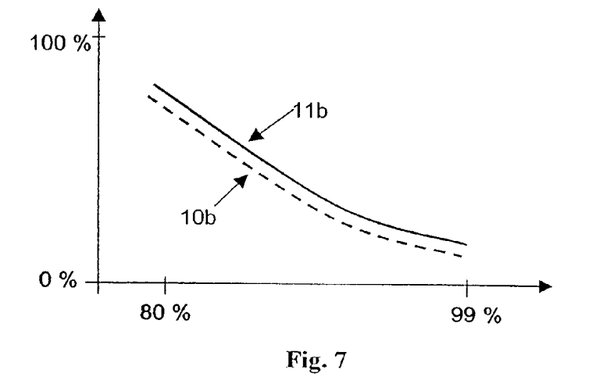
FIG. 7 depicts a diagram of the achieved reduction in the gradient of the bending moments along the wing, resulting from the change in the toe angle of the winglet.

FIG. 7 in respect of the JAR25 angle of yaw maneuver shows the gradient of the bending moments in the main direction of extension in the outer region of a wing element with which a winglet with 10b and without 11b toe angle change of 4° is connected. The abscissa shows the position $y_{F,P}$ on the wing in relation to the length $l_F$ of the wing in the outer region right up to the transition to the winglet in %, while the ordinate shows the amount of the bending moment in %. It becomes clear that the change in the toe angle may also significantly reduce the wing load.

Figure 8A:
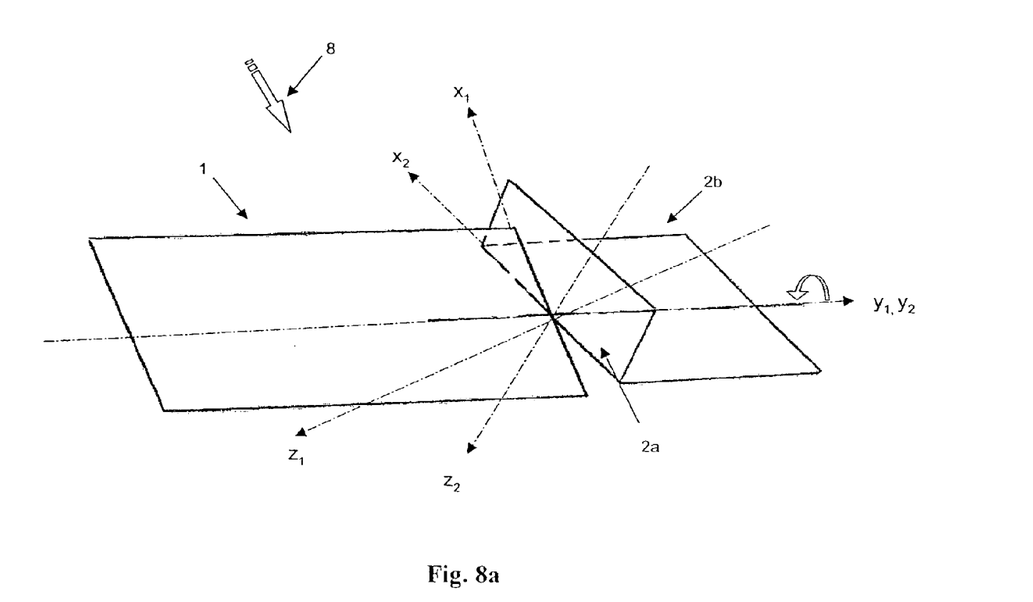
FIG. 8a illustrates a diagrammatic view of a rotatable winglet comprising two parts.

FIG. 8a shows a further embodiment in which the winglet comprises an upward-oriented part (2a) and an outward-oriented part (2b). For the sake of clarity only rotation on the $y_1$-axis is shown. Consequently the body coordinate system $x_1, y_1, z_1$ is moved to the new coordinate system $x_2, y_2, z_2$. In the case of significant angles of incidence of the wing element 1 corresponding to the local direction 8, rotation on the $y_1$-axis results in a significant reduction of the bending moments on the winglet and on the wing. The upper part may ensure that no gap is formed towards the front during rotation on the $y_1$-axis.

Figure 8B:
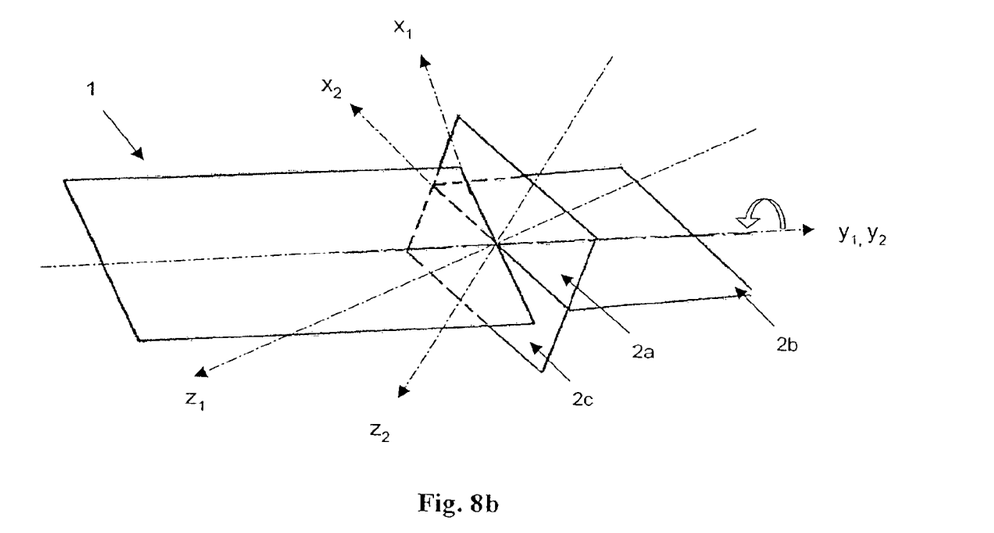
FIG. 8b shows a further diagrammatic view of a rotatable winglet comprising three parts.
Figure 8C:
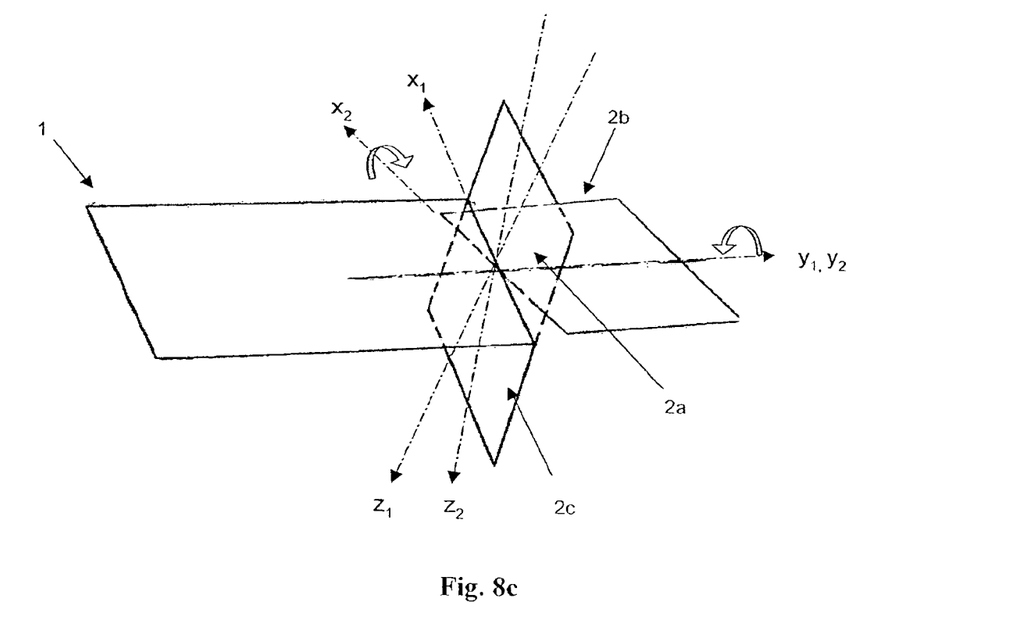
FIG. 8c illustrates a further diagrammatic view of a rotatable winglet comprising three parts, one part of which is rotatable.

FIGS. 8b and 8c shows 3-part winglet designs. When compared to FIG. 8a the upper part 2a continues downward 2c. In this way during rotation on the $y_1$-axis, both on the front and on the rear wing-to-winglet transition, the formation of a gap may be prevented. In FIG. 8b the upper part 2a and the lower part 2c rotate together with the outer part 2b. In FIG. 8c only the outer winglet part 2b rotates.

The winglet-to-wing transition, the angle between the upper and the outer winglet part, as well as the geometric design of the winglet parts (curvature, profile thickness, sweep, etc. . . . ) may be selected such that, taking into account all the flight phases, optimal aerodynamic characteristics and load characteristics and thus minimal fuel consumption and optimal economy may be achieved.

To this effect the winglet may be provided with additional rotary options. Furthermore, the winglet may be supplemented by further rotatable parts.

In practical application, the rotary movements may at all times be carried out simultaneously rather than in sequence.

In this arrangement, the toe angle, the flap position of the winglet 2 relative to the fuselage, and/or rotation on the $y_1$-axis may be controlled by an onboard computer on the basis of the measured flight state data such as, for example, flight altitude, yaw angle, angle of incidence, roll angle, flight speed, angle of yaw, etc. For example, it may thus be possible to automatically react to any critical aerodynamic load, and the effective aerodynamic surface of the winglet may be reduced.

In addition it should be pointed out that "comprising" does not exclude other elements or steps, and "a" or "one" does not exclude a plural number. Furthermore, it should be pointed out that characteristics or steps which have been described with reference to one of the above embodiments may also be used in combination with other characteristics or steps of other embodiments described above. Reference characters in the claims are not to be interpreted as limitations.

Alternative combination and variations of the examples provided will become apparent based on this disclosure. It is not possible to provide specific examples for all of the many possible combinations and variations of the embodiments described, but such combinations and variations may be claims that eventually issue.

The invention claimed is:

1. An adaption device for adapting aerodynamic characteristics of a wing element, comprising:
   a winglet movably attachable to the wing element, wherein the winglet is attachable on an attachment axis to the wing element, such that the winglet is rotatable around the attachment axis as a rotary axis having a rotary axis direction, and an angle between the rotary axis direction and a direction of a main axis of extension of the wing element differs from 90°, wherein the direction of the main axis of extension is perpendicular to an axial direction along the axis of an aircraft fuselage to which the wing element is attached.

2. The device of claim 1, wherein the winglet is rotatable in relation to the wing element on three rotary axes, the rotary axis of claim 1 being one of the three rotary axes.

3. The device of claim 1, further comprising the wing element.

4. The device of claim 1, further comprising an aerodynamic fairing element between the wing element and the winglet or a portion of the winglet.

5. The device of claim 1, further comprising at least one suspension element attaching the winglet to the wing element.

6. The device of claim 5, wherein the at least one suspension element is controllably movable.

7. The device of claim 5, wherein the at least one suspension element is movable by means of a driven spindle.

8. The device of claim 1, further, comprising a drive device for moving the winglet.

9. The device of claim 8, wherein the drive device is selected from the group consisting of electric, hydraulic, piezoelectric drives and active materials.

10. The device of claim 9, wherein the drive device is selected as a piezoceramic active material.

11. The device of claim 1, wherein the winglet is divided into an upper part and a lower part, wherein of the upper part of the winglet, the lower part of the winglet or both thereof are movable.

12. The device of claim 11, wherein the upper part, the lower part or both thereof are divided into a plurality of sub-parts, and at least one of the plurality of sub-parts is designed so as to be movable.

13. The device of claim 1, wherein the winglet comprises an upper part, a lower part and an outer part, wherein one or more of the upper part, the lower part or the outer part of the winglet is designed so as to be movable.

14. The device of claim 1, wherein in addition to the winglet, a part of the wing element or an entire wing element, including the winglet, is adapted for being rotatable.

15. A locomotion device, comprising an adaption device for adapting aerodynamic characteristics of a wing element of claim 1.

16. The locomotion device of claim 15, wherein the locomotion device is an aircraft.

17. A method for adapting aerodynamic characteristics of a wing element, comprising the step of rotating on two rotary axes a winglet that is attached to the wing element in relation to the wing element such that an angle between one of the two rotary axes, having a first rotary axis direction and a direction of a main axis of extension of the wing element differs from 90°, wherein the direction of the main axis of extension is perpendicular to an axial direction along the axis of an aircraft fuselage to which the wing element is attached.

18. The method of claim 17, wherein the step of rotating the winglet includes providing an onboard computer unit, for controlling the winglet on the basis of measured aircraft data.

19. The method of claim 17, wherein the step of providing onboard computer unit includes providing the onboard computer unit comprising a regulating unit adapted for regulating a rotation of the winglet.

20. The method of claim 19, wherein the step of providing includes providing the regulating unit as an adaptive regulating unit, wherein the adaptive regulating unit is capable of adapting to a plurality of flight parameters and aircraft parameters.

21. The method of claim 17, wherein the method includes controlling wing torsion using the winglet.

22. The method of claim 17, wherein the method includes controlling wing bending.

\* \* \* \* \*